Aug. 31, 1926.
M. BLOOM ET AL
1,598,041
MEAT CUTTER'S SAFETY APRON
Filed Sept. 14, 1925
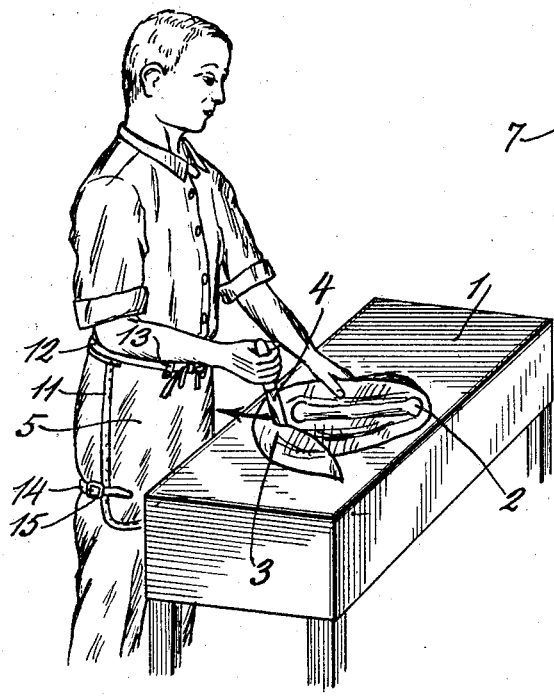
Fig. 1.
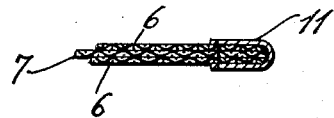
Fig. 3.
Fig. 5.
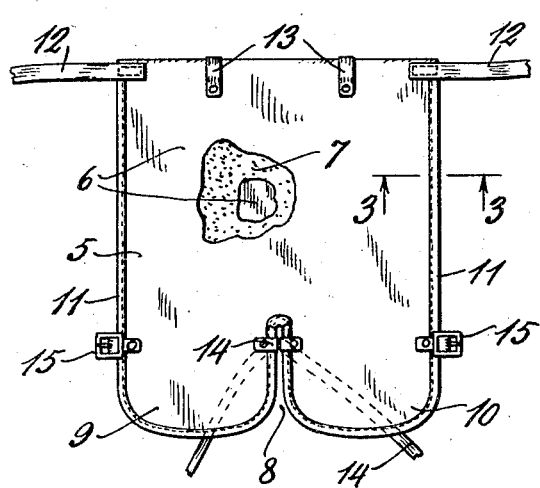
Fig. 2.
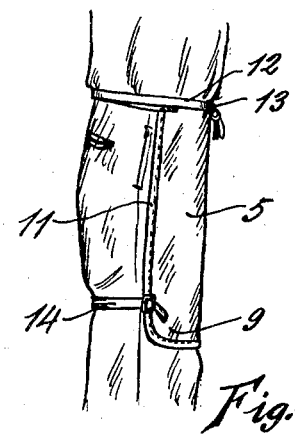
Fig. 4.
Inventors
Mannie Bloom,
Leo Holladay.
By 
Attorney Patented Aug. 31, 1926.

1,598,041

UNITED STATES PATENT OFFICE.

MANNIE BLOOM AND LEO HOLLADAY, OF SANATORIUM, COLORADO.

MEAT-CUTTER'S SAFETY APRON.

Application filed September 14, 1925. Serial No. 56,154.

This invention relates to safety aprons for butcher meat cutters and other artizans.

Butchers and meat cutters, especially, are constantly employing sharp knives in boning and cutting meat. It sometimes happens that the knife slips and that its point penetrates the operator's abdomen with serious and at times fatal consequences. Even the most careful worker is liable to have such an accident.

Butchers and meat cutters ordinarily wear a white apron of muslin or other suitable cloth that such aprons obviously afford no protection against knife thrusts.

It is the object of this invention to produce an apron of such material that its offers complete protection against cuts due to the accidental slipping of the knife while cutting or boning meats.

The improved apron that forms the subject of this invention is made of two thicknesses of moderately heavy canvas separated by a layer of metal reenforced asbestos packing cloth. This asbestos cloth is made from threads spun about a metal wire and forms an armor that can be pierced by the sharp point of a knife, only with the greatest difficulty. The canvas although not so resistant, offers considerable protection of themselves. This apron is of such shape and size that it will cover the wearer's abdomen, groins and the upper portion of the legs.

In order to describe the invention with the greatest possible clearness, reference will be had to the accompanying drawing in which it has been illustrated and in which:

Fig. 1 is a perspective view showing the manner of using a knife in boning meats and showing the position of the safety apron;

Fig. 2 is a plan view of the apron, portions being torn away so as to show the three thicknesses;

Fig. 3 is a section taken on line 3—3 Fig. 2;

Fig. 4 is a view showing the manner in which the apron is attached to the wearer's legs, and Fig. 5 is a view, to an enlarged scale, showing the construction of the asbestos lining.

Numeral 1 represents the top of an ordinary meat cutter's block and 2 a bone that is being removed from a piece of meat 3. The butcher is shown in the act of removing the bone 2 and holds in his right hand a knife 4 whose point is moved in the direction of the arrow. If the knife should slip its point would move towards the operator's abdomen and unless it could be stopped in time, a serious cut might result. To guard against injury due to such accidents, the safety apron 5 is worn. This apron has the shape indicated in Fig. 2 and is formed from three thicknesses of material, namely, two layers of heavy canvas that have been designated by the numeral 6 and a central layer 7 of metal reenforced asbestos cloth. The apron has a cut 8 at its lower end which divides it into the leg protective portions 9 and 10. The sides and the bottom of the apron are secured together by a leather binding 11. Fastened to the upper end of the apron near the corners are straps 12 that serve to secure the apron to the wearer's waist. The ends of these straps are passed through loops 13 secured to the front of the apron. Fastened to the inner edges of parts 9 and 10 are straps 14 that are adapted to be secured by means of buckles 15 to the outer side of parts 9 and 10 and which holds these parts against the front of the wearer's legs. When the apron is properly secured in place, it covers the wearer's abdomen, groins and the upper portions of his legs. If the knife should accidentally slip and strike the apron, it will not penetrate this because the asbestos lining is very resistant and a greater amount of force is required to penetrate this than would ordinarily be present in an accidental slipping, such as is to be guarded against. Besides, the asbestos the heavy canvas also serves to stop the knife. In addition to the resisting qualities of the material, the fact that it is supported by the yielding flesh of the wearer makes it still harder to penetrate the apron than it would if it were supported on an unyielding surface. The asbestos lining is woven from threads 16 that have a central metal core, usually a copper wire 17. This makes a cloth that is extremely difficult to cut and which forms an almost absolute protection against accidental injury from sharp instruments such as knives. It is not absolutely essential that the lining 7 shall be made from asbestos, as it may be made from cotton and woven with metal cored threads. This metal reenforced cotton cloth is not as resistant as the asbestos cloth, but affords substantial protection in all but extreme cases.

Although the apron has been described as useful more particularly for butchers and meat cutters, it is evident that it is equally useful in many other trades where sharp tools are employed.

Having now described our invention, what we claim as new is:

1. A protective apron comprising two layers of canvas separated by a layer of cloth woven from threads having a metal core.

2. A protective apron comprising two layers of canvas separated by a layer of asbestos cloth woven from threads having a metal core.

In testimony whereof we affix our signatures.

MANNIE BLOOM.
LEO HOLLADAY.